July 19, 1949.  A. B. SKROMME  2,476,828
ENDLESS BAND TRACK
Filed Sept. 7, 1946

INVENTOR
ARNOLD B. SKROMME

BY

ATTORNEYS

Patented July 19, 1949

2,476,828

UNITED STATES PATENT OFFICE 2,476,828

ENDLESS BAND TRACK

Arnold B. Skromme, St. Joseph, Mich., assignor to The Firestone Tire & Rubber Company, Akron, Ohio, a corporation of Ohio Application September 7, 1946, Serial No. 695,401

4 Claims. (Cl. 305—10)

This invention relates to band tracks for track laying vehicles, especially to endless band tracks which usually are driven by suitable means.

Heretofore, in the various types of endless band track manufactured, it has been difficult to retain the track on its drive pulleys and bogie wheels when the track laying vehicle is being turned around a corner, or going around a curve. Such a turning movement of the track, in track laying vehicles, produces laterally directed stresses in the track and such stresses frequently so distort the track as to cause it to jump from its engagement with its mounting and drive means. This difficulty has been especially noticeable with friction drive tracks.

The general object of this invention is to overcome the above, and other disadvantages of and objections to known endless band track constructions and to provide a band track which is characterized by its stability against lateral distortion.

Another object of the invention is to provide an endless band track which is resistant to lateral distortion by forces at an appreciable transverse angle to the track's longitudinal axis.

A further object of the invention is to provide an easily manufactured, relatively inexpensive, improved endless track.

The foregoing and other objects and advantages of the invention, which will be made apparent as the specification proceeds, are achieved, broadly speaking, by an endless oval-shaped rubber body having a tread on its outer surface, circumferentially extending reenforcing means embedded in such rubber body, and a plurality of layers of reenforcing means embedded in the rubber body with the reenforcing means in such layers being at an appreciable angle to the longitudinal axis of the track and with the reenforcing means in adjacent reenforcing layers being at opposite angles with the longitudinal axis of the band track.

Attention now is directed to the accompanying drawings wherein.

Figure 1:
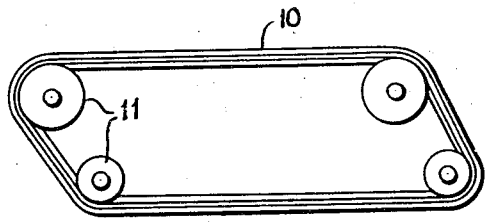
Fig. 1 is an elevation of a band track embodying the principles of the invention.
Figure 2:
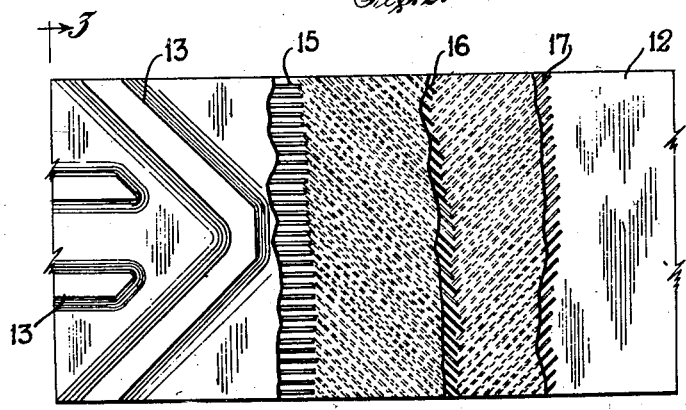
Fig. 2 is a fragmentary plan of the track of Fig. 1 with the layers of the track being removed to show the construction thereof.
Figure 3:
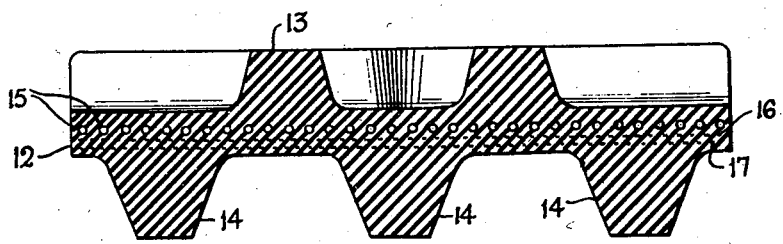
Fig. 3 is a vertical section taken on line 3—3 of Fig. 2.

Referring more in detail to the accompanying drawings, there is shown a substantially oval-shaped band track 10, which is adapted to be mounted on and driven by frictional engagement with suitable pulleys 11. The endless band track 10 mainly comprises a rubber body 12, which is of roughly rectangular shape in transverse section and which has a suitable tread 13 formed on its outer surface. On its radially inner surface the rubber body 12 has a plurality of circumferentially extended V-shaped ribs 14 which are adapted to engage with complementary formed recesses in the pulleys 11 of the structure on which the band track 10 will be mounted. The ribs 14 may engage with only the sides of the pulleys 11 in some instances. The band track 10 is made of a suitable vulcanized rubber composition so as to have desirable wearing properties and to be sufficiently stiff to carry the loads for which such band tracks will be used. The band track 10 is reenforced against circumferentially directed stresses by reenforcing means having circumferentially extending members in it and, in this example, a wire cable 15 is embedded in the rubber band 10. Preferably the cable 15 is formed from a continuous length which is looped around the band track in the manufacture thereof so as to form a continuous reenforcing layer extending completely across the width of the rubber body 12, as shown in Fig. 3.

The primary feature of the present invention is that means are associated with the rubber body 12 to reenforce it against lateral deflection. It has been found that the use of pairs of reenforcing members, such as wire cable or weftless or weak weft cord fabric positioned with the warp cords on a bias with the longitudinal axis of the band track will reenforce the band track against deflection by transversely directed forces. Thus there is shown a layer of wire cables 16 which is immediately adjacent and usually radially inward of the circumferentially extending cables 15 and positioned at an angle of about 45° with the longitudinal axis of the band track. It will be noted that the cables 16 are relatively widely spaced apart and that they are made from a plurality of small wires twisted together to form the cable. Then adjacent and usually below the layer of cables 16, a similar layer of cables 17 is positioned in the rubber body 12 with the cables 17 being at an opposite angle to the cables 16 but with the cables 17 also being at substantially an angle of 45° with the longitudinal axis of the band track. Preferably all of the cables 15, 16 and 17 are brass plated in the conventional manner prior to their assembly in the rubber body 12 so that the ultimate vulcanized band track 10 has a good bond between such cables and the rubber body. The cables 16 and 17 are formed into a layer in a conventional manner, as by depositing the cables on a rubber sheet in the desired parallel and spaced relationship, after which sections can be cut from such rubber sheet with the cables extending at the desired angle from the edges of such rubber sheet or fabric section. Thus, by positioning the edges of such rubber sheets along the edges of the band track in its construction, the reenforcing cables can be deposited in layers which have reenforcing cables therein that extend at the desired angle to the longitudinal axis of the band track.

It has been found that the reenforcing cables 16 and 17 may extend at angles of from about 15° to 70° to the longitudinal axis of the band track and good lateral stability still can be obtained. However, it likewise appears that more desirable results are obtained when the cables in the reenforcing layers extend at an angle of from 45° to 60° with the longitudinal axis of the band track. While in the drawings only two layers of reenforcing cables 16 and 17 are shown, in some instances it might be desirable to use more than this number of transverse stabilizing reenforcing layers. However, in all events, the adjacent reenforcing layers will have the reenforcing means therein extending at opposite and equal angles to the longitudinal axis of the band track.

It has been indicated that the body 12 is made from rubber and this term is used broadly so as to include natural and synthetic rubber as well as rubber-like materials. Likewise, the reenforcing cables 16 and 17 can be formed of any desired material and such cables could be formed in an integral ply which is folded over on itself to provide adjacent and oppositely directed cables.

It will be seen that the power transmitting member of the invention is reenforced by circumferentially extending means, such as wire cables, or fabric, and by cable or fabric means extending at an appreciable angle to such circumferentially extending means so that the band track is reenforced against both circumferentially and laterally directed forces regardless of their origin and the objects of the invention are achieved. Of course, the endless member of the invention can be used with any desired type of mounting and drive means.

While in accordance with the patent statutes, I have illustrated and described in detail one embodiment of my invention, it will be understood that I am not to be limited thereto or thereby but that the scope of the invention is defined solely by the appended claims.

What is claimed is:

1. An endless band track comprising an oval-shaped rubber band which is substantially rectangular in cross-section, said band having driving ribs formed on its inner surface, a spirally disposed circumferentially extending cable embedded in said rubber band and forming a reinforcing layer therein, a second layer of separate relatively widely spaced wire cable embedded in said rubber band radially inwardly from said circumferentially extending cable and at an angle of approximately 45° thereto, and a third layer of separate relatively widely spaced wire cable embedded in said rubber band radially inwardly from said first layer of relatively widely spaced wire cable and at an angle of approximately 45° with said first layer.

2. An endless rubber band track comprising a first layer, spirally disposed circumferentially extending cord-like reenforcing member embedded in said rubber band, a second layer of relatively widely spaced wire cable embedded in said rubber band radially inwardly of said circumferentially extending member with the wires of the second member at a substantial angle to the cord-like member of said first layer and a third layer of relatively widely spaced wire cable embedded in said rubber band radially inwardly of said second layer of relatively widely spaced wire cable at an opposite and substantial angle to the wires of said second layer.

3. In an endless rubber band track, a plurality of circumferentially extending reenforcing wires that are substantially parallel to the longitudinal axis of the track, and a plurality of layers of individual wires spaced longitudinally of the track which are positioned at an angle from about 15° to 75° with the longitudinal axis of the track, the wires in adjacent layers of said layers being at opposite angles to each other to produce lateral stability in the track.

4. In an endless rubber band track, a plurality of layers of individual wires spaced longitudinally of the track which are positioned at an angle from 15° to 75° with the longitudinal axis of the track, the wires in adjacent layers of said layers being at opposite angles to each other.

ARNOLD B. SKROMME.

REFERENCES CITED

The following references are of record in the file of this patent:

UNITED STATES PATENTS

| Number | Name | Date |
| --- | --- | --- |
| 1,627,287 | Kegresse | May 3, 1927 |
| 2,025,999 | Myers | Dec. 31, 1935 |
| 2,067,400 | Koplin et al. | Jan. 12, 1937 |
| 2,211,202 | Freedlander | Aug. 13, 1940 |
| 2,290,109 | Mayne | July 14, 1942 |